(12) United States Patent
Wilburn

(10) Patent No.: US 10,986,949 B1
(45) Date of Patent: Apr. 27, 2021

(54) STEAMER STAND SYSTEM AND METHOD OF USE

(71) Applicant: Robert D. Wilburn, Houston, TX (US)

(72) Inventor: Robert D. Wilburn, Houston, TX (US)

( * ) Notice: Subject to any disclaimer, the term of this patent is extended or adjusted under 35 U.S.C. 154(b) by 45 days.

(21) Appl. No.: 15/684,789

(22) Filed: Aug. 23, 2017

Related U.S. Application Data

(60) Provisional application No. 62/378,524, filed on Aug. 23, 2016.

(51) Int. Cl.
| | |
|---|---|
| *A47G 25/40* | (2006.01) |
| *D06F 73/00* | (2006.01) |
| *F16M 11/28* | (2006.01) |
| *F16M 11/24* | (2006.01) |

(52) U.S. Cl.
CPC ............. *A47G 25/40* (2013.01); *D06F 73/00* (2013.01); *F16M 11/242* (2013.01); *F16M 11/28* (2013.01)

(58) Field of Classification Search
CPC .... A47G 25/40; A47G 25/06; A47G 25/0664; A47G 25/0671; A47G 25/0685; A47G 25/0692; A47G 25/14; A47G 25/16; A47G 25/20; A47G 25/22; A47G 25/28; A47G 25/30; A47G 25/44; A47G 25/50; A47G 25/62; A47G 25/66; D06F 73/00; F16M 11/242; F16M 11/00; F16M 11/28; F16M 11/20; F16M 11/16; F16M 11/18; F16M 11/24

See application file for complete search history.

(56) References Cited

U.S. PATENT DOCUMENTS

| | | | |
|---|---|---|---|
| 863,820 A * | 8/1907 | Wingert | |
| 958,366 A * | 5/1910 | Clausen | A47G 25/66 223/95 |
| 1,176,563 A * | 3/1916 | Johnson | A47G 25/0664 211/196 |
| 1,450,416 A * | 4/1923 | Freshour | A47F 5/06 223/120 |
| 1,525,701 A * | 2/1925 | Rose | A47G 25/0664 211/196 |
| 2,249,348 A * | 7/1941 | Dery | A47G 25/0664 211/171 |
| 2,341,424 A * | 2/1944 | Chason | A41H 5/00 223/120 |
| 2,418,106 A * | 3/1947 | Zimmermann | A47G 25/66 223/95 |
| 3,310,180 A * | 3/1967 | Neagle | A47G 25/0664 211/205 |
| 5,094,369 A * | 3/1992 | Thompson | A42B 1/002 223/15 |
| 5,609,047 A * | 3/1997 | Hellman, Jr. | D06F 73/00 239/538 |

(Continued)

*Primary Examiner* — Ismael Izaguirre
(74) *Attorney, Agent, or Firm* — Richard Eldredge; Leavitt Eldredge Law Firm

(57) ABSTRACT

A steamer stand includes a telescoping vertical shaft extending from a first end to a second end; a foldable tripod stand removably attached to the first end adjustably attached to the telescoping vertical shaft; a telescoping horizontal rod removably attached to the telescoping vertical shaft, the telescoping horizontal rod with a first section having a first knob and a second section having a second knob; a hanger removably attached to the second end of the telescoping vertical shaft; a vertical extension secured to the telescoping vertical shaft.

1 Claim, 6 Drawing Sheets

(56) References Cited

U.S. PATENT DOCUMENTS

| 8,418,860 B2* | 4/2013 | Rimmer | D06F 57/04 |
| | | | 211/85.7 |
| 2005/0236532 A1* | 10/2005 | Bain | A47G 25/0664 |
| | | | 248/158 |

* cited by examiner

STEAMER STAND SYSTEM AND METHOD OF USE

BACKGROUND

1. Field of the Invention

The present invention relates generally to stands, and more specifically, to steamer stands and methods of use.

2. Description of Related Art

Steamers for clothes are well known in the art and are effective means to clean and remove wrinkles from clothing. In FIG. 1, and exemplary conventional steamer 101 is shown having a nozzle 103 configured to direct steam 105 in a direction towards a shirt 100 for removing wrinkles and/or for cleaning. The steamer 101 includes a housing 107 within an inner cavity configured to carry a steam generator 113 in fluid communication with a reservoir 111. During use, the generator 113 creates steam, which in turn is channeled to nozzle 103 via a hose 115 in gaseous communication with the inner cavity of housing 107.

Although effective in most applications, the steamer 101 has limitations. For example, the process is arduous and time consuming. The user is required to manipulate the shirt 100 and orient the nozzle at various orientations and locations to adequately remove the shirt wrinkles. The process is further limited by having a bulky body 107 that the user is required to haul around to perform the steaming operation.

Another disadvantage with system 101 is that the shirt is loosely hung on a hanger 102, which in turn needs to be manipulated to effectively steam the article of clothing. In some scenarios, there is no structure to hang the hanger, which in turn requires the user to hold the hanger while applying steam to the article of clothing.

Although great strides have been made in the area of steamers, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
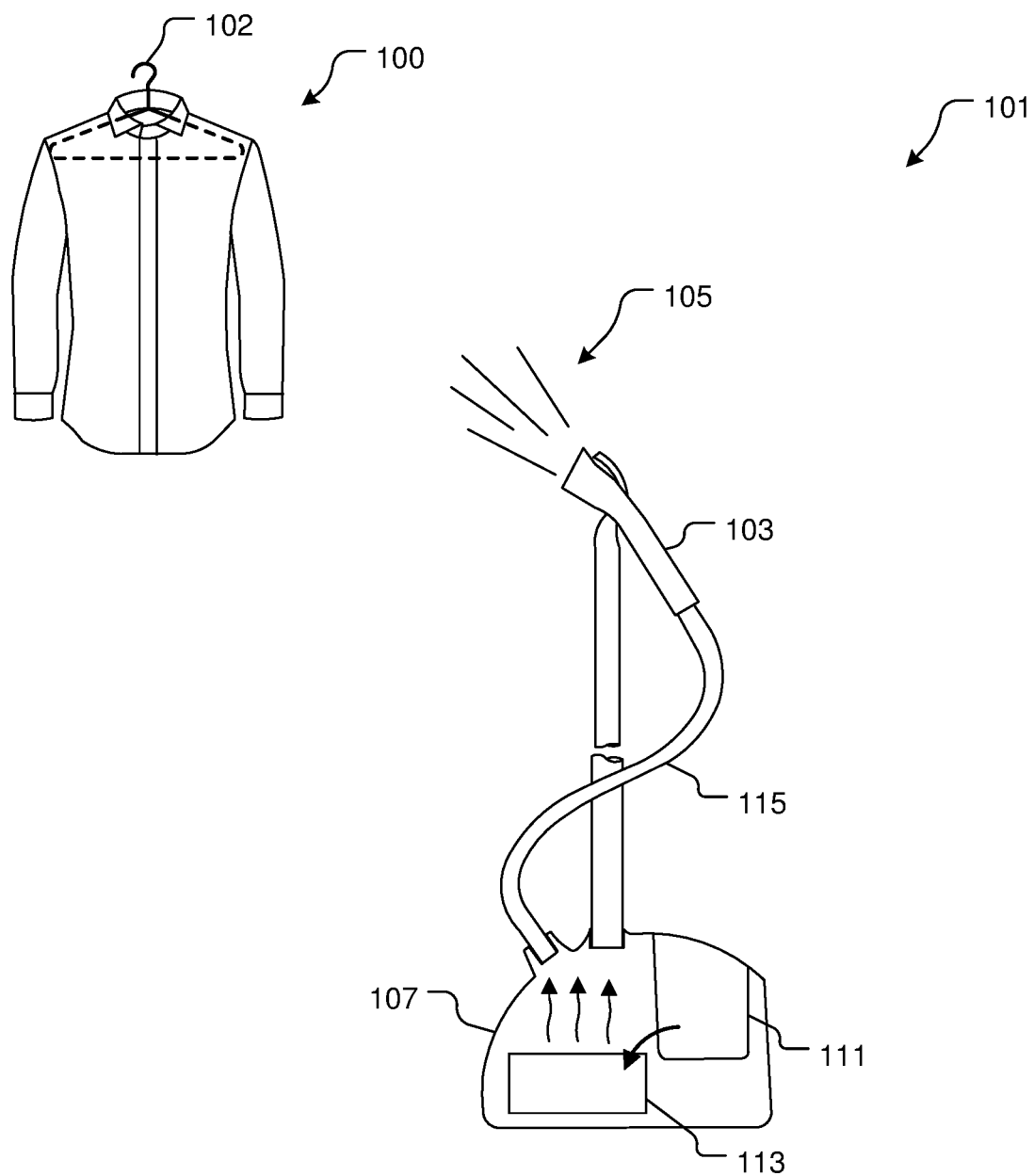
FIG. 1 is a simplified schematic of a conventional steamer.
Figure 2:
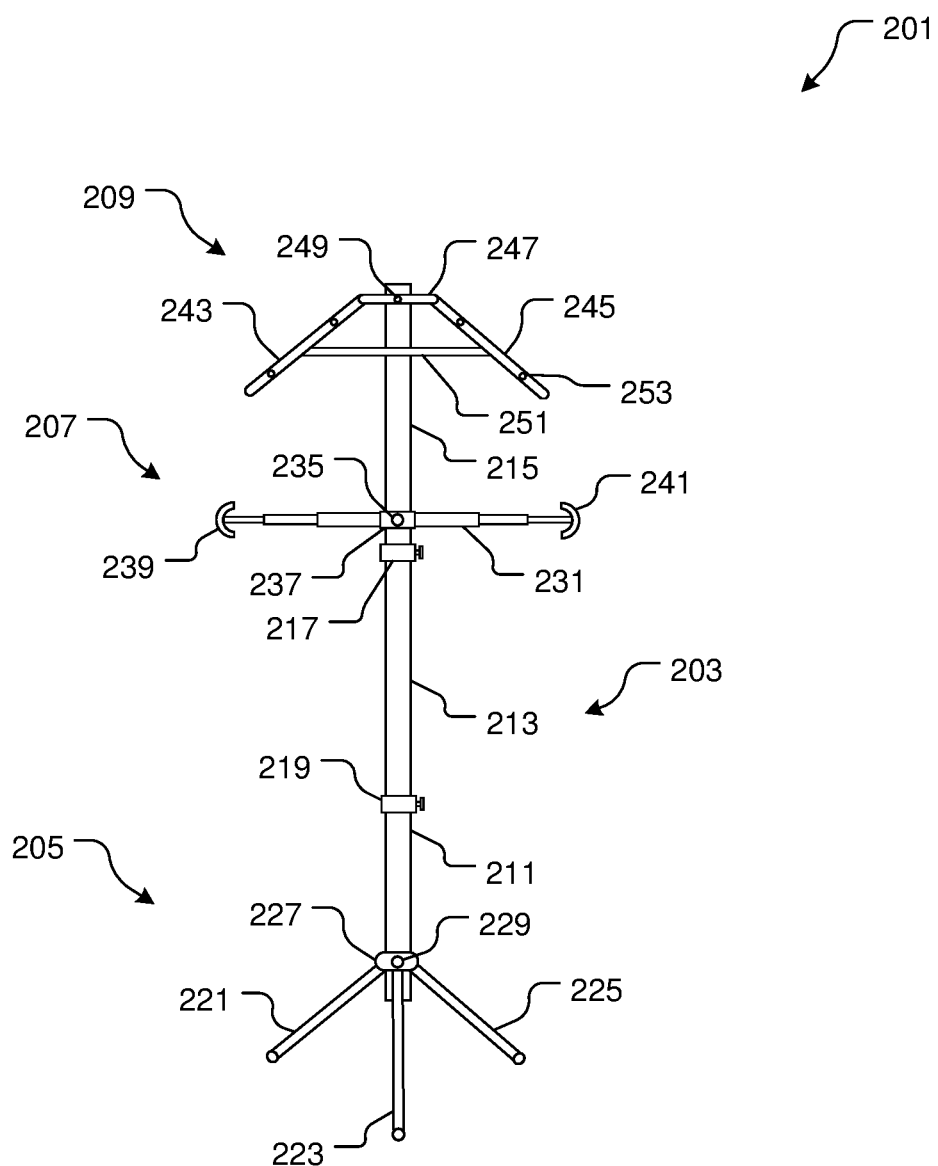
FIGS. 2 and 3 are front views of a steamer stand system in accordance with one embodiment of the present application during operation.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 5:
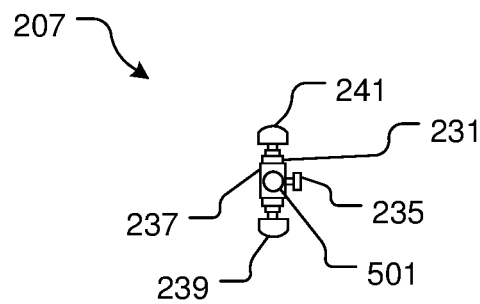
FIG. 5 is a side view of the horizontal rod of the system of FIG. 2.
Figure 6:
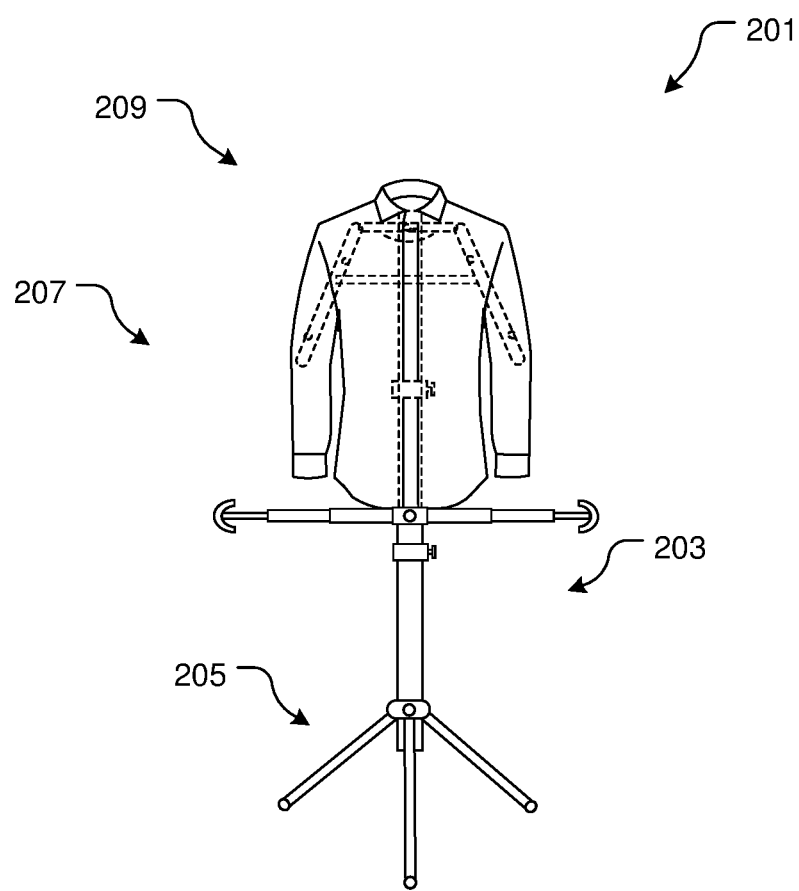
FIG. 6 is the system of FIG. 2 with a shirt secured thereto.
Figure 7:
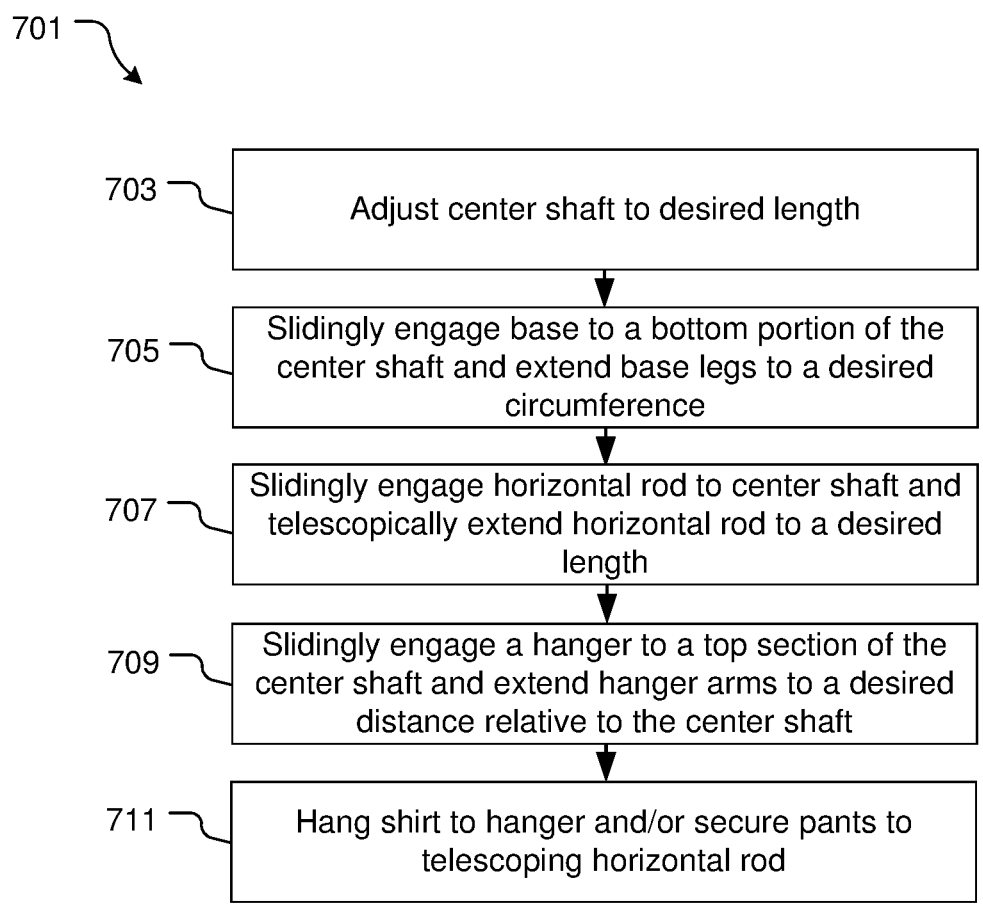
FIG. 7 is a flowchart of the preferred method of use.

Referring now to the drawings wherein like reference characters identify corresponding or similar elements throughout the several views, FIGS. 2-6 depict various views of a steamer stand system 201, while FIG. 7 illustrates a simplified flowchart 701 of the preferred method of use. It will be appreciated that system 201 overcomes one or more of the above-listed problems commonly associated with the conventional steamer systems and methods of use.

In the contemplated embodiment, system 201 includes one or more of an adjustable center shaft 203 with a base 205 removably secured at a first section and a hanger 209 removably secured to a second section of the center shaft 203. The system is further provided with a removably horizontal rod 207 disposed between the hanger 209 and the base 205.

Figures 3, 4:
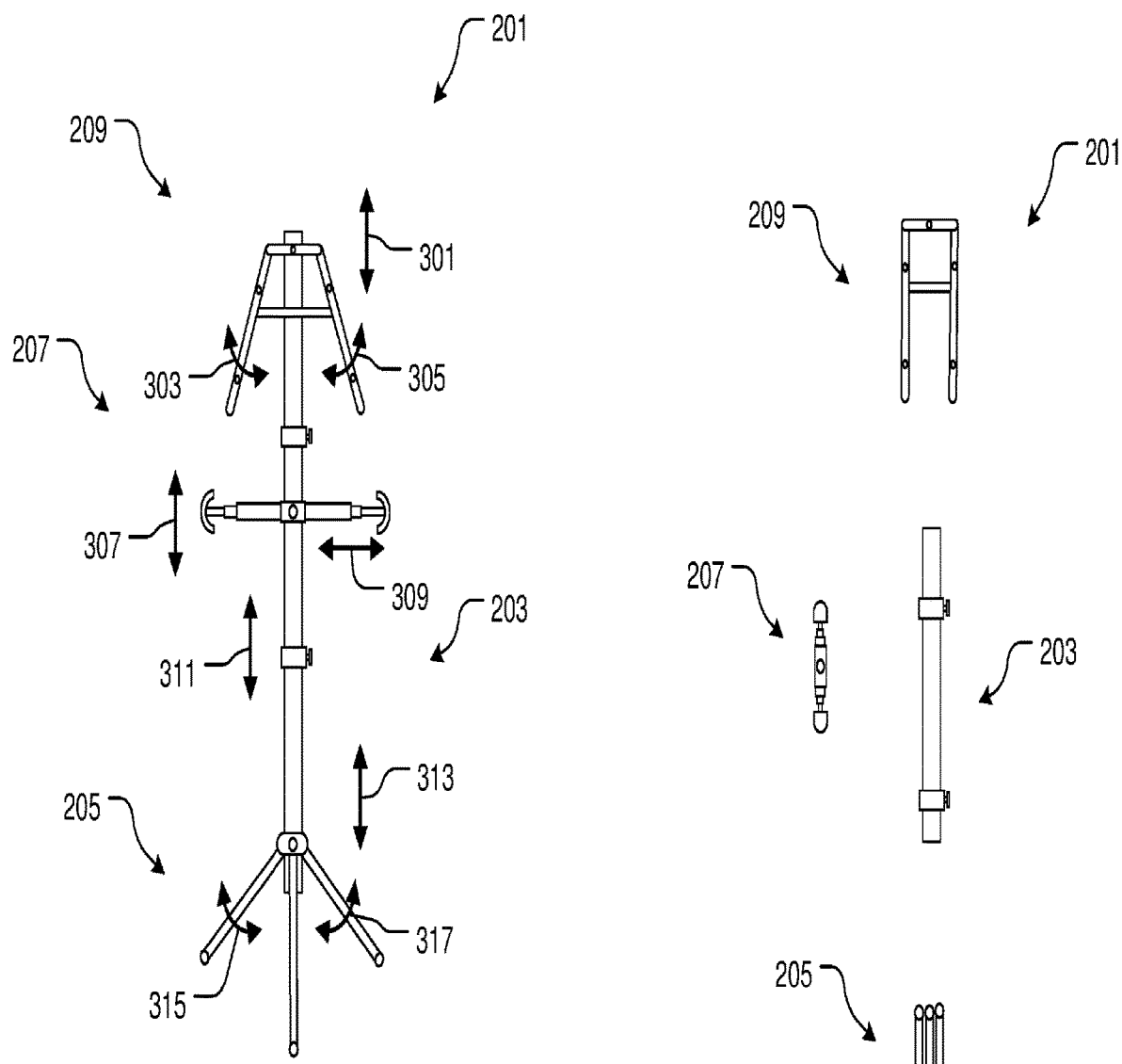
FIG. 4 is a disassembled front view of the system of FIG. 2.

It should be appreciated that one of the points of novelty believed characteristic of the present invention is the use of telescoping members that compact into a portable size. Accordingly, the user is able to transport the stand system 201 during travel. Also, the members are adjustable in length and orientation relative to each other, as shown in FIG. 3. The members are configured to removably attach to each other to facilitate ease of transport and compaction.

In the exemplary embodiment, center shaft 203 includes a plurality of sections 211, 213, and 215 that interlock with each other via locking members 217, 219. It is preferred that sections 211, 213, and 215 slidingly engage with each other to a compacted size, as shown in FIG. 4. The locking member 217 and 219 are include a housing with an opening that receives the center shaft member therethrough and a fastener in communication with the opening and adapted to contact the shaft member to secure the shaft sections in a fixed position. Accordingly, the center shaft is adjustable to a desired height relative to a ground surface (not shown). It will be appreciated that alternative embodiments could further include an extension section that increases the overall length of the center shaft.

The base 205 includes three or more legs 221, 223, and 225 pivotally secured to a housing 227 that in turn slidingly engages with section 211. A locking member 229 is adapted to secure the housing in a fixed position relative to section 211. In one preferred embodiment, the locking member 229 could include a fastener extending through the thickness of the housing and adapted to engage with the outer surface of the shaft section 211. It will be appreciated that the base 205 effectively secures the center shaft 203 in a relatively vertical position to the ground surface.

The horizontal rod 207 includes a telescoping shaft 231 secured to a housing 237 configured to slidingly engage with section 215. The housing 237 is fixed in position relative to section 215 via a locking member 235 substantially similar to locking member 229. The horizontal rod 207 is further provided with knobs 239 and 241 secured at opposing ends of the shaft 231. In one contemplated method of use, the knobs 239, 241 are intended to create a space between the article of clothing secured thereto for more effective steaming.

The hanger 209 preferably includes a first arm 243 and a second arm 245 pivotally secured to a housing 247 that slidingly engages with the section 215 of center shaft 203. The housing is secured in a fixed position via a locking member 249 substantially similar to locking member 235. The hanger 209 is further provided with an optional shaft 251 configured to retain the arms 243, 245 at a spaced position relative to each other. In one embodiment, the shaft 251 could telescopically engage with the arms, as shown in FIG. 4. The hanger 209 could further include a plurality of holes 253 extending through the thickness of the hanger arms and configured to engage with a hanger.

In FIG. 3, the movement of each member of system 201 is shown. The hanger 209 is configured to slidingly engage with the center shaft 203 and the arms are configured to pivot relative to each other, as depicted with arrows 301, 303, and 305. The horizontal rod 207 is configured to slidingly engage with the center shaft 203 and the shaft is configured to telescope, as depicted with arrows 307, 309. The sections of the center shaft 203 are configured to telescopically engage with each other, as depicted with arrow 311. The base 205 is configured to slidingly engage with the center shaft 203 and the legs are configured to pivot relative to each other, as depicted with arrows 313, 315, and 317.

As shown in FIG. 4, the members of the system 201 are configured to disengage with each other, which in turn facilitates ease of use during travel and setup. In FIG. 5, a side view of the horizontal rod 207 is shown. As depicted, the housing 237 forms an opening 501 configured to receive a section of the center shaft therethrough. In FIG. 6, a front view of the system 201 is shown during use. The hanger 209 is adjusted to secure a shirt at a height relative to the ground surface.

FIG. 7 depicts a simplified flowchart 701 of the intended method of use. The system 201 discussed above includes a method of use comprising adjusting the center shaft to a desired length and securing the base, the horizontal rod, and the hanger to the center shaft. The members of the system 201 are adjusted to a desired length and orientation to receive a shirt thereto for steaming. These features are shown in boxes 703, 705, 707, 709, and 711 in the flowchart.

It should be understood that although the systems discussed herein are utilized with shirts, it will be appreciated that that the system could be utilized with different types of clothing, for example, pants, scarves, dresses, and the like. It will also be appreciated that the systems discussed herein could be utilized with different types of fabrics in lieu of articles of clothing. For example, the system could be used to provide steam to a curtain, table cloth, and the like.

Figure 8A:
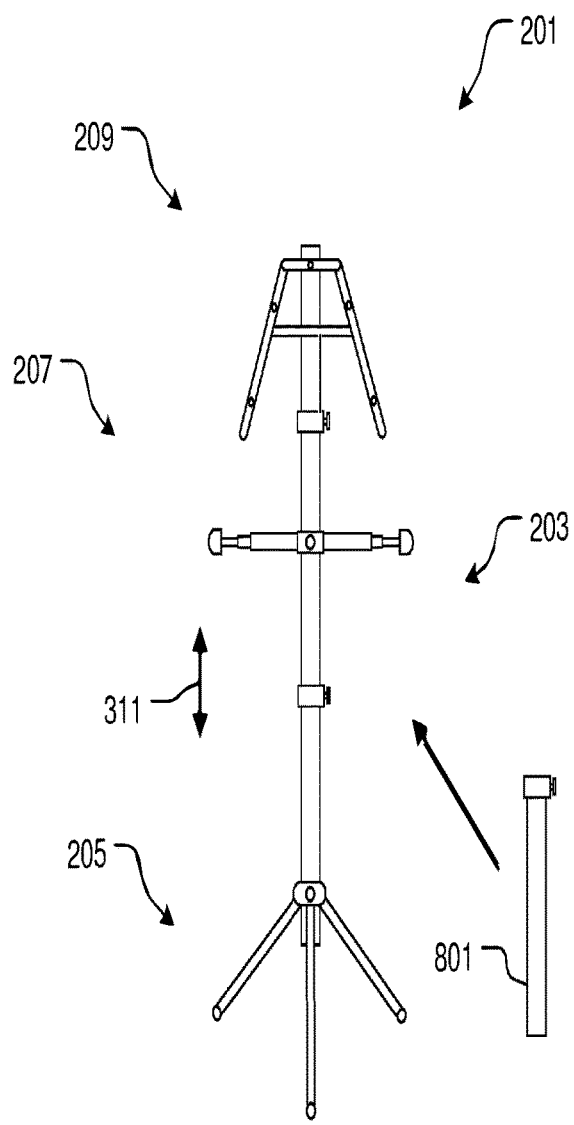
FIGS. 8A and 8B are front views of the system of FIG. 2 with an extension.
Figure 8B:
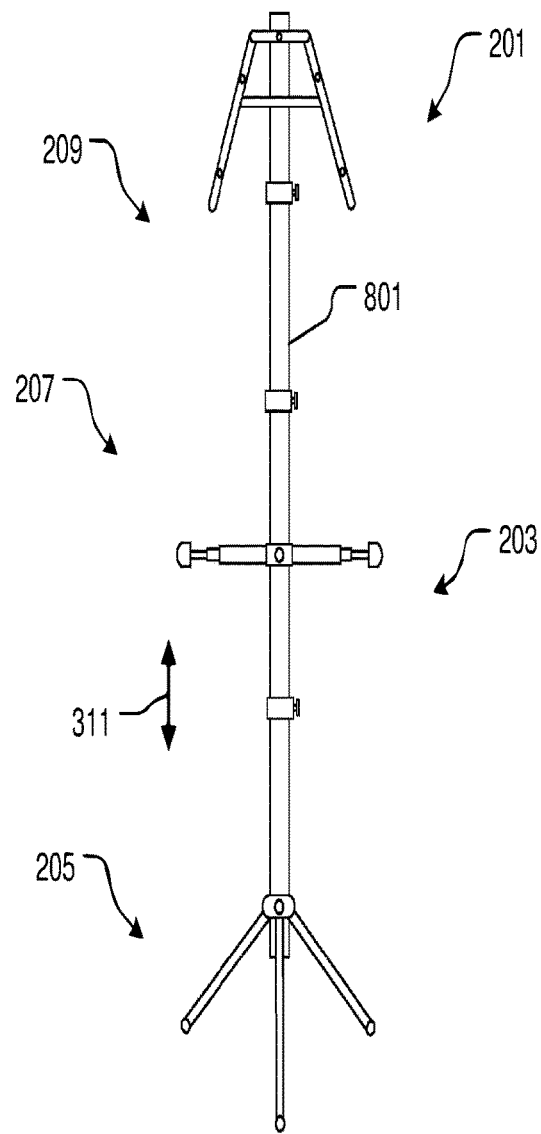

Referring now to FIGS. 8A and 8B, front views of the system are shown with an extension 801 that could be utilized to increase the overall length of the center shaft. In one contemplated embodiment, the extension slidingly engages with one or more members of the center shaft as depicted in the drawings.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A steamer stand, comprising:
   a telescoping vertical shaft extending from a first end to a second end;
   a foldable tripod stand removably attached to the first end and adjustably attached to the telescoping vertical shaft;
   a first locking member secured to the foldable tripod stand and configured to removably secure the foldable tripod stand to the first end of the telescoping vertical shaft;
   a telescoping horizontal rod removably attached to the telescoping vertical shaft, the telescoping horizontal rod having:
      a first section having a first knob; and
      a second section having a second knob;
   a second locking member secured to the telescoping horizontal rod and configured to removably secure the telescoping horizontal rod to the telescoping vertical shaft;
   a hanger removably attached to the second end of the telescoping vertical shaft;
   a third locking member secured to the hanger and configured to removably secure the hanger to the telescoping vertical shaft; and
   a vertical extension secured to the telescoping vertical shaft;

wherein the telescoping horizontal rod is positioned between the telescoping vertical shaft and foldable tripod stand.

\* \* \* \* \*